Anderson & Cooley,
Ditching Machine.

No. 94,539. Patented Sept. 7, 1869.

Witnesses
O. Hinchman
Ma H Brooks

Inventors
J. Anderson
J. B. Cooley
Per Munn & Co.
Atty's

UNITED STATES PATENT OFFICE.

JAMES S. ANDERSON AND JAMES B. COOLEY, OF CLARK'S HILL, INDIANA.

IMPROVEMENT IN DITCHING-MACHINES.

Specification forming part of Letters Patent No. 94,539, dated September 7, 1869.

*To all whom it may concern:*

Be it known that we, JAMES S. ANDERSON and JAMES B. COOLEY, of Clark's Hill, in the county of Tippecanoe and State of Indiana, have invented a new and Improved Ditching-Machine; and we do hereby declare that the following is a full, clear, and exact description thereof, which will enable others skilled in the art to make and use the same, reference being had to the accompanying drawings, forming part of this specification, in which—

Figure 1:
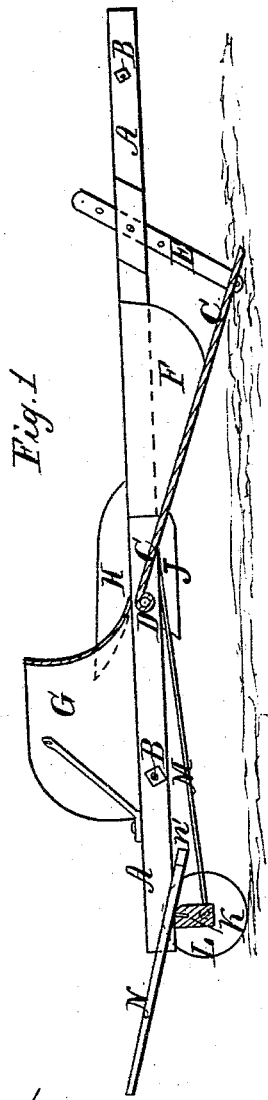
Figure 2:
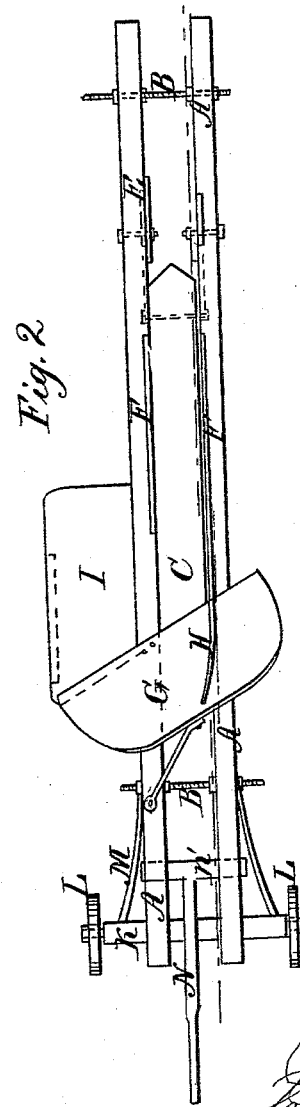
Figure 3:

Figure 1 is a detail longitudinal view of our improved machine, taken through the line $x$ $x$, Fig. 2. Fig. 2 is a top view of the same. Fig. 3 is a detail view of a modified form of the dirt shovel or lifter.

Similar letters of reference indicate corresponding parts.

Our invention has for its object to furnish a simple, convenient, and effective ditching-machine, which shall be so constructed and arranged that it may be easily adjusted to cut a straight ditch for laying tiles, or a tapering open ditch, as may be desired; and it consists in the construction and combination of various parts of the machine, as hereinafter more fully described.

A are the sills or longitudinal beams of the machine, which are connected to each other at or near their ends by the rods B, having screw-threads cut upon each of their ends.

Upon each end of each rod B are placed two nuts, one upon each side of each of the sills A, as shown in Fig. 2, so that by shifting the said nuts the sills A may be moved toward each other to adjust the machine for cutting a straight ditch, or moved from each other to adjust it for cutting a tapering ditch.

C is the lifter, shovel, or plow, the upper end of which is pivoted to and between the sills or beams A by a bolt or rod, D, passing through the said beams or sills, and through a hole in the upper end of the lifter C, as shown in Fig. 1.

For digging straight ditches the lifter C is made of the same breadth at its lower and upper ends, as shown in Fig. 2; but for digging tapering open ditches the lifter C should be made tapering or wider at its upper than at its lower end, as shown in Fig. 3. The lower end of the lifter C may be made pointed, to enable it to enter the ground readily; and to its side edges, near its lower end, are pivoted the lower ends of the two cutters E, the upper parts of which are adjustably secured to the inner sides of the sills or beams A by bolts, wedges, or other easily-adjusted means.

F are plates attached to the inner sides of the beams A, and extending down along the side edges of the lifter C to serve as guards, to prevent the dirt from working off at the sides of said lifter and falling back into the ditch.

G is a mold-board, attached to the upper sides of the sills A in such a position as to receive the dirt from the lifter C and guide it to the side of the ditch.

H is a guard attached to the sill A, and projecting across the mold-board G, to prevent the dirt from passing off the said mold-board in the wrong direction.

I is an apron attached to the side of the sill A, to receive the dirt from the mold-board G and conduct it to a sufficient distance to prevent it from falling back into the said ditch. If desired, the apron H may be hinged to the said sill A, and may have a runner, J, attached to the under side of its outer edge to support the outer part of said apron, and at the same time keep the dirt back from the edge of the ditch. The rear ends of the sills A rest upon the axle K, upon the journals of which revolve the wheels L.

To the axle K are attached the rear ends of the rods M, which extend forward, and the forward ends of which are connected with the beams or sills A. N is a lever, having a cross-head, $n'$, formed upon or attached to it. The lever N is pivoted to the axle K with the cross-head $n'$ beneath the sills or beams A, as shown in Figs. 1 and 2, so that the rear end of the machine may be conveniently raised and lowered, as required.

The forward end of the machine may be supported upon truck-wheels, runners, or in any other convenient manner.

Having thus described our invention, what we claim as new, and desire to secure by Letters Patent, is—

1. An improved ditching-machine, formed by the combination of the beams or sills A, adjustably connected by the screw-rods and nuts B, lifter or plow C, adjustable cutters E, guard-plates F, mold-board G, guard H, and apron I, whether provided with the guard-runner J or not, with each other, substantially as herein shown and described, and for the purpose set forth.

2. The combination of the axle K, wheels L, bars or rods M, and cross-head lever N n', with the rear parts of the sills or beams A, substantially as herein shown and described, and for the purposes set forth.

JAMES S. ANDERSON.
JAMES L. COOLEY.

Witnesses:
OTTU H. STROBE,
I. B. CRICK.